(12) United States Patent
Bradley et al.

(10) Patent No.: US 7,130,902 B2
(45) Date of Patent: Oct. 31, 2006

(54) METHODS AND APPARATUS FOR DETECTING AND PROVIDING NOTIFICATION OF COMPUTER SYSTEM PROBLEMS

(75) Inventors: Donald A. Bradley, Raleigh, NC (US); Robert P. Noble, Wake Forest, NC (US)

(73) Assignee: GE Mortgage Holdings, LLC, Raleigh, NC (US)

( * ) Notice: Subject to any disclaimer, the term of this patent is extended or adjusted under 35 U.S.C. 154(b) by 613 days.

(21) Appl. No.: 10/063,067

(22) Filed: Mar. 15, 2002

(65) Prior Publication Data

US 2003/0177222 A1 Sep. 18, 2003

(51) Int. Cl.
*G06F 15/173* (2006.01)
(52) U.S. Cl. .................. 709/224; 709/224; 709/223
(58) Field of Classification Search ............ 709/224, 709/223, 235; 714/42, 47
See application file for complete search history.

(56) References Cited

U.S. PATENT DOCUMENTS

| | | | |
|---|---|---|---|
| 5,838,919 A * | 11/1998 | Schwaller et al. | 709/224 |
| 6,070,190 A * | 5/2000 | Reps et al. | 709/224 |
| 6,249,883 B1 * | 6/2001 | Cassidy et al. | 714/42 |
| 6,449,739 B1 * | 9/2002 | Landan | 714/47 |
| 6,681,232 B1 * | 1/2004 | Sistanizadeh et al. | 707/104.1 |
| 6,813,634 B1 * | 11/2004 | Ahmed | 709/224 |
| 6,874,099 B1 * | 3/2005 | Balasubramanian et al. | 714/4 |

* cited by examiner

*Primary Examiner*—Ario Etienne
*Assistant Examiner*—Sahera Halim
(74) *Attorney, Agent, or Firm*—Priest & Goldstein, PLLC

(57) ABSTRACT

Techniques for automatically monitoring a computer network and notifying an attendant upon detection of problems are described. A system for monitoring the computer network comprises a monitoring server connected to the network and operative to communicate with a plurality of monitored servers belonging to the network and a monitor program hosted on the monitor server and operative to test the performance and correct functioning of selected ones of the monitored servers and the presence or absence of problems related to applications running on the monitored servers.

19 Claims, 2 Drawing Sheets

METHODS AND APPARATUS FOR DETECTING AND PROVIDING NOTIFICATION OF COMPUTER SYSTEM PROBLEMS

BACKGROUND OF INVENTION

The present invention relates generally to improved techniques for monitoring computer systems. More particularly, the invention relates to methods and apparatus for automatically examining selected computer system components and applications and notifying an attendant if a server or application fails to return satisfactory responses.

Computer systems are widely used and benefit innumerable organizations of all types and sizes. In many cases, a computer system includes a large number of relatively widely distributed components and applications to provide services to users. A frequently encountered example of a large computer system is a computer network, which may include many servers running a number of different applications. These applications may run on different servers, and, particularly in large organizations, the servers may be spread over a large geographic area.

Design of a network such that applications are distributed over a number of servers prevents any one server from being overwhelmed and unable to serve users in a timely manner. However, increasing the number of servers in a network naturally increases the number of locations where problems may arise. In order to insure the smooth functioning of a network, it is important to monitor the status of critical applications running on the network, and to alert a network administrator or other responsible person in order to solve problems which are detected. Increasing the number of applications being executed by a network and the number of servers executing those applications also increases the scope of the task of monitoring the applications and servers. Many applications produce status logs which can be examined in order to detect problems, but prior art systems typically require that these status logs be examined by a human operator in order to detect problems. Such examination by a human operator occupies the time of that operator and, moreover, frequently reveals that the application producing the log is functioning normally.

A typical network administrator is frequently very busy solving problems with the computer network. It would be highly beneficial and a great saving of the time of the network administrator and his or her assistants if network problems could be automatically detected and a human operator notified upon detection of a problem.

SUMMARY OF INVENTION

An illustrative system for monitoring a computer network and notifying an attendant if a problem is detected according to one aspect of the present invention comprises a monitoring server connected to the network and operative to communicate with a plurality of monitored servers belonging to the network and a monitor program hosted on the monitor server and operative to test the performance and correct functioning of selected ones of the monitored servers and the presence or absence of problems related to applications running on the monitored servers.

A process of monitoring a network and automatically notifying an attendant of network problems according to an alternative aspect of the invention comprises the steps of testing for the presence of one or more monitored servers, testing a data transfer rate of the one or more monitored servers, examining logs maintained by one or more monitored applications for the presence of entries indicating problems and automatically notifying an attendant if one or more tests is failed or if a problem entry is present.

A more complete understanding of the invention, as well as further features and advantages of the invention, will be apparent from the following Detailed Description and from the claims which follow below.

DETAILED DESCRIPTION

Figure 1:
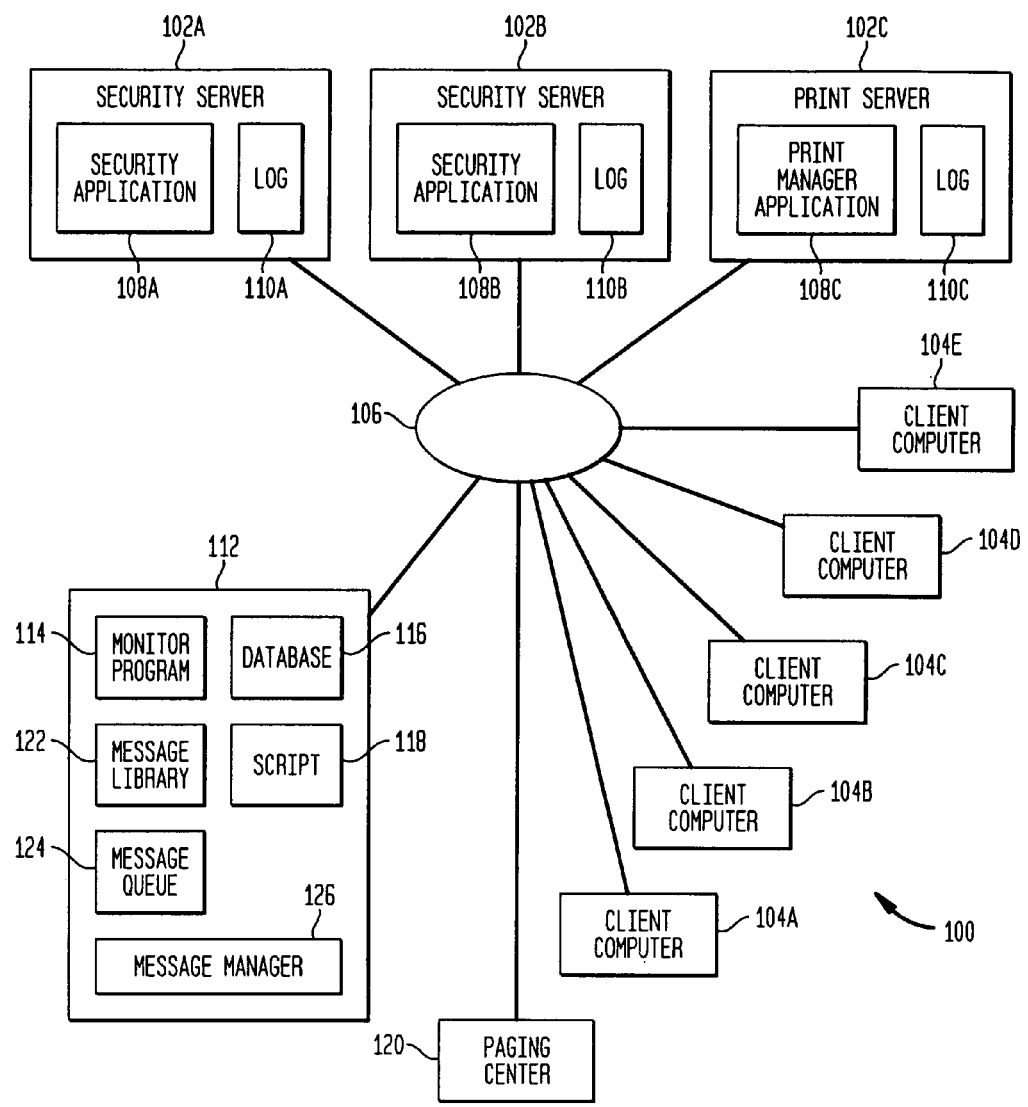
FIG. 1 illustrates a network performing self-monitoring according to an aspect of the present invention.

FIG. 1 illustrates a network 100 according to an aspect of the present invention.

The network 100 includes a plurality of servers 102A–102C. For purposes of illustration, the servers 102A–102C will be described here as a security server, a file server and a print server, respectively. While only three servers are shown as exemplary in FIG. 1, it will be recognized that a network may include a large number of servers which are not shown here for ease of illustration. The network 100 also includes a number of client computers 104A–104E communicating with the servers 102A–102C through a communication center 106. The communication center 106 is illustrated here as a single entity, but it will be recognized that the communication center 106 may be any system capable of receiving messages from a computer such as the servers 102A–102C and the clients 104A–104E and routing the messages to the proper destination. Such a communication center 106 may comprise a single hub, a series of hubs, a collection of hubs and routers, the Internet, or whatever other combination is needed or useful for correct routing of messages. Communication between the servers 102A–102C, clients 104A–104E and the communication center 106 will be described here as employing transmission control protocol/Internet protocol (TCP/IP), but it will be recognized that any suitable communication technique may be employed.

The security server 102A runs a security and authentication application 108A, the file server 102B runs a file manager application 108B and the print server 102C runs a print manager application 108C. The security and authentication application 108A produces a security event log 110A, the file manager application 108B produces a file event log 108B and the print manager application 108C produces a print event log 110C. The logs 110A–110C are preferably stored as ordinary text in order to make them more easily readable. The system 100 also includes a monitoring server 112, running a monitor program 114. It will be recognized that the monitor program 114 may reside on any of the servers 102A–102C, but is shown here as residing on a separate server in the interest of clarity. It will also be recognized that each of the servers 102A–102C may run numerous applications which can be monitored, but in the interests of avoiding repetition, only the applications 108A–108C and their logs 110A–110C will be described here.

The smooth functioning of a network such as the network 100 depends in large part on the proper functioning of all critical servers. This includes the ability of a server to send and receive messages and to maintain a proper data transfer rate. In addition, all critical applications must perform correctly. In the system 100, the applications 108A–108C enter all significant events in the logs 110A–110C, so that examination of the logs 110A–110E will show any improper event.

The monitor program 114 periodically monitors each of the servers 102A–102C and the applications 108A–108C. The monitor program 114 preferably takes information about what servers and functions are to be monitored and what conditions indicate problems from a monitor information database 116.

The monitor program 114 extracts information from the database 116 to create a script 118 to govern the testing of the network 100. The monitor program 114 then tests the response and data transfer capabilities of the servers 102A–102C in accordance with the instructions in the script 118. The monitor program also examines the event logs 110A–110C, also in accordance with the instructions in the script. The monitor application 114 may suitably modify the script in accordance with the results that it receives, in order to perform testing in the most efficient and useful manner possible.

In order to monitor a server, the monitor program 114 pings the server. Pinging is the sending of a request for a response to a server. In a system using TCP/IP protocol, the request is sent to the TCP/IP address of the server and includes the address to which the response is to be sent. For example, suppose the monitor program 114 pings the print server 102C. If the monitor program 114 does not receive a proper response, it concludes that the print server 102C is not responding and prepares a message for the network administrator or other responsible person. The message is preferably sent in the form of a page, for example by automatically telephoning a paging center 120 and sending a predetermined message retrieved from a message library 122. Preferably, the monitor program 114 does not report that the print server 102C is faulty based on a single failure to respond to a ping, but instead pings the print server 102C repeatedly, for example over a period of several minutes, and pages the administrator only if the print server 102C fails to respond satisfactorily to the series of pings.

As an alternative to managing paging of an attendant directly, the monitor program 114 may employ message queuing for transmission of messages. In such an implementation, the monitor program 114 places appropriate messages in a message queue 124 whenever sending of a message is desired. A message manager 126 periodically monitors the message queue 124. Whenever the message manager 126 detects a message in the message queue, the message manager 126 telephones the paging center 120 and relays the message which has been detected in the message queue.

In order to prevent hackers and other malicious users from impersonating one of the servers 102A–102C or the server 112, the system 100 preferably employs proper security precautions. Such precautions may, for example, take the form of an authentication signature appended to each message sent between the server 112 and one of the servers 102A–102E.

If the print server 102C has responded properly to a ping, the monitor program 114 then verifies that the print server 102C can maintain a proper data transfer rate. The monitor program 114 sends a series of pings to the print server 102C at a frequency selected to properly exercise the print server 102C. The time of each response from the print server 102C is recorded and then the timing of the responses is evaluated. If the print server 102C is unable to receive or respond to the pings at an acceptable rate, the network administrator is paged so that the problem may be investigated.

In order to avoid undue repetition, the monitor program 114 has been discussed as testing communication with the print server 102C, but it will be recognized that the monitor program 114 tests communication with each of the servers 102A–102C, in whatever sequence is desired. Moreover, if desired, the monitor program 114 may be designed to adjust the testing sequence based on results received. For example, if the print server 102C is detected to respond at a rate that is slower than usual, but not slow enough so that an attendant needs to be summoned, the monitor program 114 may increase the frequency with which communication with the print server 102C is tested so that if further slowing requiring attention occurs, it will be promptly addressed. If the response returns to normal, however, the monitor program 114 may then decrease the frequency of testing until it once again reaches the default rate.

In addition to testing communication with the servers 102A–102C, the monitor program 114 also reviews the logs 110A–110C in order to make sure that the applications 108A–108C are operating properly. The server 114 runs the script 118 in order to establish communication with the servers 102A–102C and to review desired logs. The logs 110A–110C are preferably saved and maintained under known names which change infrequently, if at all. If the name of one of the logs 110A–110C does change, or if a new application is added so that the monitor program 114 needs to review the operation of the new application, this information is added to the database 116 and can then be used to modify the script 118 to include the new or added names. Operating under control of the script 118, the monitor program 114 establishes communication with, for example, the security server 102A. The monitor program 114 retrieves the log 110A and compares the entries against the database 116. The database 116 preferably contains, for each log maintained by a monitored application, all entries whose presence indicates problems. The monitor program 114 may also evaluate the frequency and timing of such entries. If a questionable entry or series of entries is found, the monitor program 114 pages the network administrator with an appropriate message. For example, if evaluation of the security event log revealed a series of failed login attempts over a short period of time, the monitor program 114 pages the network administrator in order to alert him or her of a possible attempt to breach security. The monitor program 114 establishes communication with the servers 102A–102C and reviews the logs 110A–110C in whatever sequence is desired, and may be designed to adjust the review cycle in light of results, as described above.

It is possible for the logs 110A–110C to be implemented in the form of databases. Such an implementation adds power and flexibility to a search for errors and other noteworthy conditions. With the logs 110A–110C implemented as databases, it is possible for the monitor program 114 to construct queries to search for specific conditions or combinations of conditions. If a particular combination of conditions is worthy of special note, the monitor program 114 can periodically query the logs 110A–110C using a database query defining that combination of conditions. The query may suitably be constructed using structured query language or any other suitable form of query implementation consistent with the design of the logs 110A–110C.

It will be recognized that each of the servers 102A–102C may host numerous applications, any number of which may maintain logs to be reviewed by the monitor program 114, and that, as noted above, the network 100 may include numerous other servers which may be monitored. Moreover, monitor programs similar to the monitor program 114 may run on multiple servers throughout the network 100, each monitoring a group of servers and applications running on those servers, in order to distribute the monitoring tasks and thereby to avoid overburdening any single server or monitor program.

While monitoring of a network 100 has been illustrated here by way of example, it will be recognized that the techniques of the present invention may be employed to monitor computer systems which are not part of a network, for example by running a monitor program such as the program 114 on an individual computer system in order to monitor the operation of that system. In addition, techniques similar to those illustrated here may be employed to monitor the availability and data transfer rate of components which communicate with one another but which are not part of a computer network as the term is commonly understood.

Figure 2:
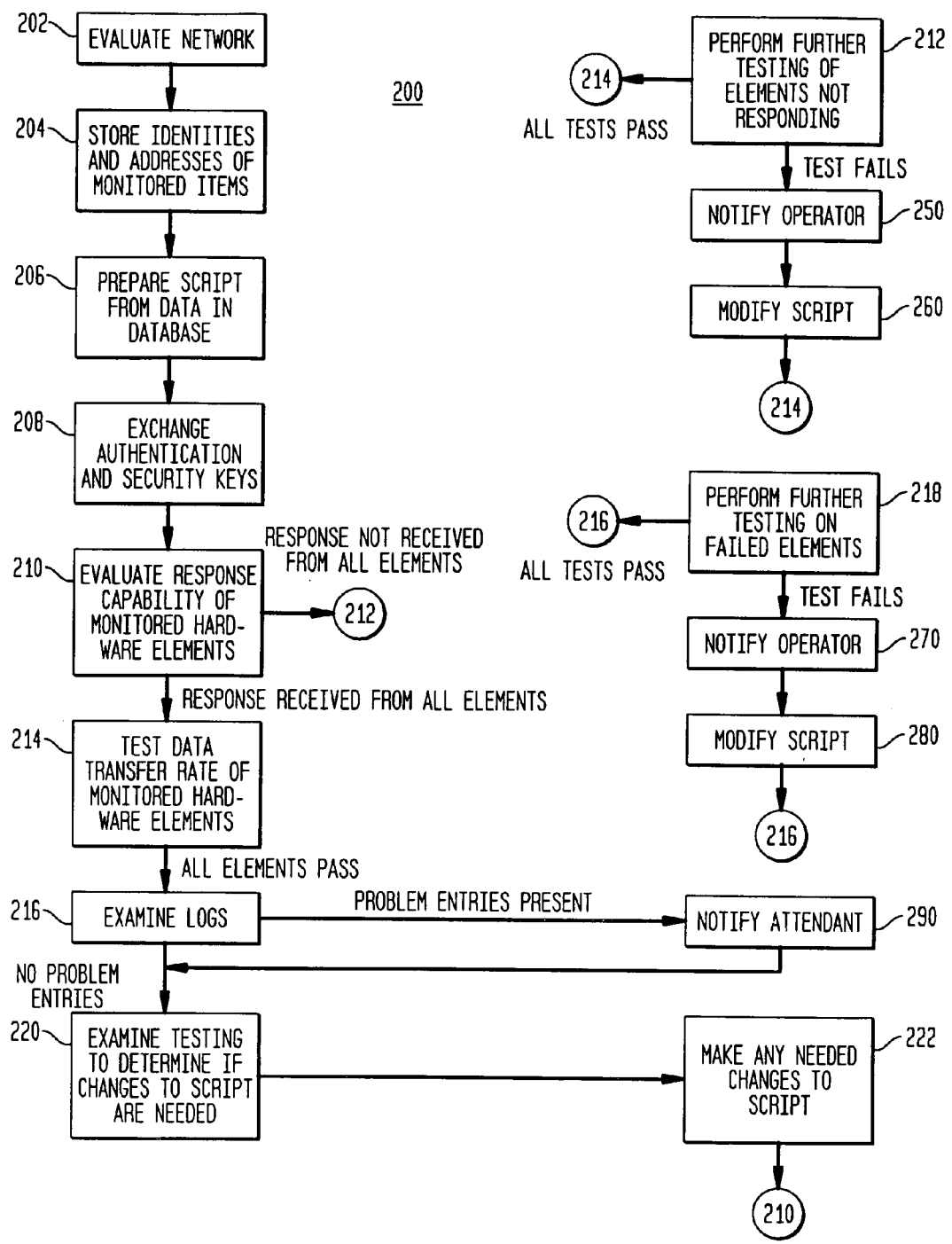
FIG. 2 illustrates a process of automatic monitoring of a network according to an aspect of the present invention.

FIG. 2 illustrates a process 200 of network evaluation according to the present invention. At step 202, a network is evaluated to determine which server or servers should be monitored, what functions should be monitored, what event logs, if any, are maintained by functions which should be monitored and what events or sequence of events indicate problems which require notifying an attendant. At step 204, the results of the evaluation are analyzed and the identities and addresses of the servers to be monitored are stored in a database, along with the names of functions to be monitored, the names of the logs maintained by those functions, which log entries or sequences of log entries indicate problems and the expected rate at which the servers should receive and return data. The database also preferably maintains a set of messages to be transmitted to an attendant, with an appropriate message or messages being associated with each event requiring notification.

At step 206, a script is prepared using the information in the database, in order to govern the methods and sequence of evaluation of various network elements and to determine what responses are to be expected from each network element which is tested. At step 208, authentication and security keys are exchanged between the elements testing and being tested, in order to prevent spurious commands from being acted on and to prevent receipt of information by unauthorized parties. At step 210, the response capability of each of a plurality of hardware elements, such as servers, executing monitored functions is tested. This testing is preferably done by pinging the elements and noting whether a correct response is received. If a correct response is received from all elements, the process proceeds to step 214. If a correct response is not received from an element, the process proceeds to step 212 and further testing is performed to determine whether a response can be obtained. If a response is obtained from each element, the process proceeds to step 214. If an element fails to provide a response obtained, the process proceeds to step 250, an appropriate message is prepared and an attendant is paged with the message. The process then proceeds to step 260 and the script is modified so that the operator will not be sent further messages about the element which failed to respond. This approach prevents numerous duplicate pages resulting from repeated testing of an element which has failed to return a response. The process then proceeds to step 214.

Turning now to step 214, the data transfer rate of each of a plurality of hardware elements is tested, preferably by repeatedly pinging each entity and evaluating the timing of the responses. If all elements achieve a satisfactory data transfer rate, the process proceeds to step 216. If an element has failed to achieve a satisfactory data transfer rate, the process proceeds to step 218 and further testing is performed to determine whether a satisfactory transfer rate can be achieved. If the subsequent testing produces a satisfactory transfer rate, the process proceeds to step 216. If a satisfactory transfer rate is still not achieved, the process proceeds to step 270, an appropriate message is prepared and an attendant is paged with the message. The process then proceeds to step 280 and the script is modified so that the transfer rate of the failed element will not be repeated. This is to prevent numerous duplicate pages resulting from repeated testing of an entity which has failed to return a response. However, the testing of the presence of the element will continue, so that the operator will still be able to receive messages if the entity fails to perform at all, and designated tests other than the test of the transfer rate will be conducted. The process then proceeds to step 216.

Turning now to step 216, the event log associated with each function being monitored is examined to determine if it contains an entry or sequence of entries indicating problems. If no problem is detected, the process proceeds to step 220. If desired, the event log may be constructed as a database and examination of the event log may include preparing and submitting a query defining conditions of particular interest.

If a problem is detected, the process proceeds to step 290, a message is prepared indicating the nature of the problem and sent to an attendant. Preparation of the message and paging of the attendant may suitably be accomplished by submitting a message to a message queue and subsequent retrieval of the message for transmission to the attendant. The process then proceeds to step 220.

At step 220, the results of testing, as well as any previously stored results, are examined to determine if the script needs to be modified to change the methods and sequence of testing. At step 222, the results of the last round of testing are stored and any needed changes to the script are made. The process then proceeds to step 210.

While the present invention is disclosed in the context of aspects of a presently preferred embodiment, it will be recognized that a wide variety of implementations may be employed by persons of ordinary skill in the art consistent with the above discussion and the claims which follow below.

The invention claimed is:

1. A system for monitoring a computer network and notifying an attendant if a problem is detected, comprising:
   a monitoring server connected to the network and operative to communicate with a plurality of monitored servers belonging to the network, the plurality of monitored servers running applications and producing logs of run events occurring as a result of running said applications;
   a database storing problem information including problem events or a sequence of problem events indicating a problem; and
   a monitor program hosted on the monitoring server and operative to test the performance and correct functioning of selected ones of the monitored servers and the presence or absence of problems related to the applications running on the plurality of monitored servers, the monitor program being operable to extract problem information from the database, the monitor program being operable to test for the presence or absence of problems related to applications running on the plurality of monitored servers by examining the run events from the logs to detect a problem event or a sequence of problem events extracted from the database wherein the monitoring server decreases the testing of a server in the event that the rate of testing has been increased because the data transfer rate of the server has been determined to be low and subsequent tests of the server have determined that the data transfer rate has returned to normal.

2. The system of claim 1, wherein the monitoring server communicates with the monitored servers using a TCP/IP protocol.

3. The system of claim 2, wherein the monitor program is operative to test the presence and data transfer rate of the monitored servers.

4. The system of claim 3, wherein the monitor program tests the presence of the monitored servers by utilizing a ping service to ping one or more of the monitored servers and noting whether the monitored server or servers answer the ping correctly.

5. The system of claim 4, wherein the monitoring servers and the monitored servers provide authentication information to one another and wherein the monitored servers do not respond to a ping from the monitoring servers in the absence of proper authentication information from the monitoring server and wherein the monitoring server does not recognize a response from a monitored server in the absence of proper authentication information from the monitored server.

6. The system of claim 5, wherein the monitoring server tests the data transfer rate of the monitored servers by sending a series of pings to one or more of the monitored servers, timing responses received from the monitored server and evaluating the timing of the responses to determine whether the data transfer rate is satisfactory.

7. The system of claim 6, wherein the monitoring server is operative to retest a server whose presence is not detected or which does not provide a proper data transfer rate and wherein the monitoring server does not notify the attendant of a test failure if the retest passes.

8. The system of claim 7, wherein the monitoring server is operative to increase the frequency at which the data transfer rate if a server is tested if the data transfer rate of the server is determined to be lower than expected but not low enough that the data transfer rate is determined to be unsatisfactory.

9. The system of claim 1, wherein the monitoring server is operative to modify testing sequences and procedures in response to test results received from the monitored servers.

10. The system of claim 9, wherein the monitoring server is further operative to notify the attendant if one or more logs includes a problem event.

11. The system of claim 10, wherein the monitoring server is operative to prepare a query specifying a problem event of particular interest and to examine one or more of the logs for the problem event meeting the terms of the query.

12. The system of claim 11, further comprising a message library storing messages to be sent to the attendant, wherein the monitoring application is operative to select an appropriate message from the message library and send the message to a paging center in order to page the attendant with the message.

13. The system of claim 11, further comprising a message library storing messages to be sent to the attendant, and wherein the monitoring application is operative to select an appropriate message from the message library and place the message in a message queue for subsequent retrieval for transmission to the attendant.

14. A method of monitoring a network and automatically notifying an attendant of network problems, comprising the steps of:
   testing for the presence of one or more monitored servers;
   utilizing a monitor program hosted on a monitoring sever connected to the network;
   testing a data transfer rate of the one or more monitored servers, the one or more monitored servers running applications and producing logs of run events occurring as a result of running said applications;
   extracting problem information from a database including problem events or a sequence of problem events indicating a problem;
   utilizing the monitor program;
   examining said logs maintained by one or more monitored applications for the presence of at least one problem event extracted from the database;
   notifying an attendant if one or more tests is failed or if at least one problem event is present; and
   decreasing the testing of a server in the event that the rate of testing has been increased because the data transfer rate of the server has been determined to be low and subsequent tests of the server have determined that the data transfer rate has returned to normal.

15. The method of claim 14 wherein the step of testing for the presence of the one or more servers includes pinging the address of each server whose presence is to be tested for and noting whether or not a response to the ping is received, with a failure to receive a response indicating a failure of the test.

16. The method of claim 15 wherein the step of testing the data transfer rate of the one or more monitored servers comprises sending a series of pings to one or more of the monitored servers, timing responses received from the monitored server and evaluating the timing of the responses to determine whether the data transfer rate is satisfactory.

17. The method of claim 16 wherein the step of testing for the presence of the one or more servers is preceded by a step of preparing a script to direct testing and wherein the step of notifying the attendant of a failure is followed by a step of modifying the script so that the attendant is no longer notified of a failure of the element which failed the test.

18. The method of claim 17 wherein the step of examining logs maintained by one or more monitored applications includes preparing a query identifying a problem event of particular interest and searching the logs for problem events meeting the terms of the query.

19. The method of claim 18 wherein the step of notifying the attendant includes submission of a message to a message queue and subsequent retrieval of the message from the queue for transmission to the attendant.

* * * * *